(12) United States Patent
Cho et al.

(10) Patent No.: US 6,724,323 B2
(45) Date of Patent: Apr. 20, 2004

(54) METHOD AND APPARATUS FOR CONTROLLING THE ROTATION POSITION OF AN OBJECT

(75) Inventors: Young-wan Cho, Seoul (KR); Young-sun Chun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/320,518

(22) Filed: Dec. 17, 2002

(65) Prior Publication Data

US 2003/0225484 A1 Dec. 4, 2003

(30) Foreign Application Priority Data

Jun. 4, 2002 (KR) ........................................ 2002-31291

(51) Int. Cl.[7] .............................................. H03M 1/22
(52) U.S. Cl. .......................................... 341/11; 101/35
(58) Field of Search ........................ 341/11, 6; 101/35, 101/36, 38.1

(56) References Cited

U.S. PATENT DOCUMENTS

| | | | |
|---|---|---|---|
| 4,419,613 A | * | 12/1983 | Ichinose et al. ............ 318/632 |
| 5,433,541 A | * | 7/1995 | Hieda et al. ................ 400/279 |
| 5,877,710 A | * | 3/1999 | Kagerbauer .................. 341/35 |
| 6,031,801 A | * | 2/2000 | Ishikawa et al. ......... 369/47.24 |

* cited by examiner

Primary Examiner—Peguy JeanPierre
(74) Attorney, Agent, or Firm—Staas & Halsey LLPO (57) ABSTRACT

A method and an apparatus to control the rotation of an object. In the method, first and second actual control variables which vary as the object rotates are measured. It is determined whether the first actual control variable is smaller than a predetermined control variable. It is determined whether a period of time has elapsed if it is determined that the first actual control variable is smaller than the predetermined control variable. A difference between a physical quantity that is generated corresponding to the first actual control variable and the second actual control variable is obtained, and a control amount to control the object is determined by using the difference, if it is determined that the predetermined period of time has elapsed or the first actual control variable is larger than the predetermined control variable. Here, the predetermined control variable corresponds to a position to which the object should be rotated to stop the object at a desired position. The object stops precisely at the desired rotation position, thus enabling precise control of the amount of rotation of the object. The method and the apparatus may stop a roller precisely in a desired position when being used to control the rotation of the roller of an inkjet printer, thereby preventing the formation of black or white lines in a printed image.

26 Claims, 7 Drawing Sheets

METHOD AND APPARATUS FOR CONTROLLING THE ROTATION POSITION OF AN OBJECT

CROSS-REFERENCE TO RELATED APPLICATIONS

This application claims the benefit of Korean Application No. 2002-31291, filed Jun. 4, 2002, in the Korean Intellectual Property Office, the disclosure of which is incorporated herein by reference.

BACKGROUND OF THE INVENTION

1. Field of the Invention

The present invention relates to the field of controlling the rotation of an object, such as a motor or a roller used in an inkjet printer or the like, and more particularly, to a method and an apparatus to control the rotation position of an object.

2. Description of the Related Art

In certain instances, an inkjet printer must adopt a line printing method, as opposed to a page printing method, to print images, because of limited print head width. In an inkjet printer, sheets of paper must be repeatedly advanced, line after line, to print images. The advancing of the paper is achieved by contact between a line feed roller (or a paper feed roller) and a pressure roller, and rotation of the line feed roller. Here, the distance by which a sheet of paper is advanced is determined by the rotation amount of the line feed roller. If a sheet of paper is advanced slightly less than a predetermined amount, a black line is created between images. If the sheet of paper is advanced slightly more than the predetermined amount, a white line is created between images. Therefore, the degree of precision with which the rotation of the line feed roller is controlled directly affects the quality of the images printed by the inkjet printer.

In general, methods of controlling the amount of rotation of an object to be controlled, for example, a motor used in an inkjet printer, can be roughly classified as either direct or indirect methods. In a direct method, an offset error occurs due to nonlinear components, such as variations in friction load or changes in the characteristics of a motor in a normal state. In an indirect method, a speed profile is made until a motor reaches a normal state and the motor follows the speed profile to thus indirectly reach a desired rotation position. In other words, in an indirect method, a speed profile is first drawn up, and then a motor follows the speed profile in order to go from rotation position A to rotation position B. For example, in a conventional indirect method of controlling the rotation of a motor, an error speed e(kT) between a real speed v(kT) and a desired speed V(kT) of the motor is obtained, and then a voltage u(kT) to be applied to the motor is generated using an cumulative error speed value Σe(kT) and an error speed e(kT), as given by Equation 1:

$$u(kT) = K_P e(kT) + K_I \Sigma e(kT) \quad (1)$$

wherein $K_P$ and $K_I$ are weights. In this conventional method of controlling the rotation position of a motor, Equation 1 is repeatedly calculated at intervals of a predetermined length of time until the motor goes from rotation position A to rotation position B.

Figure 1:
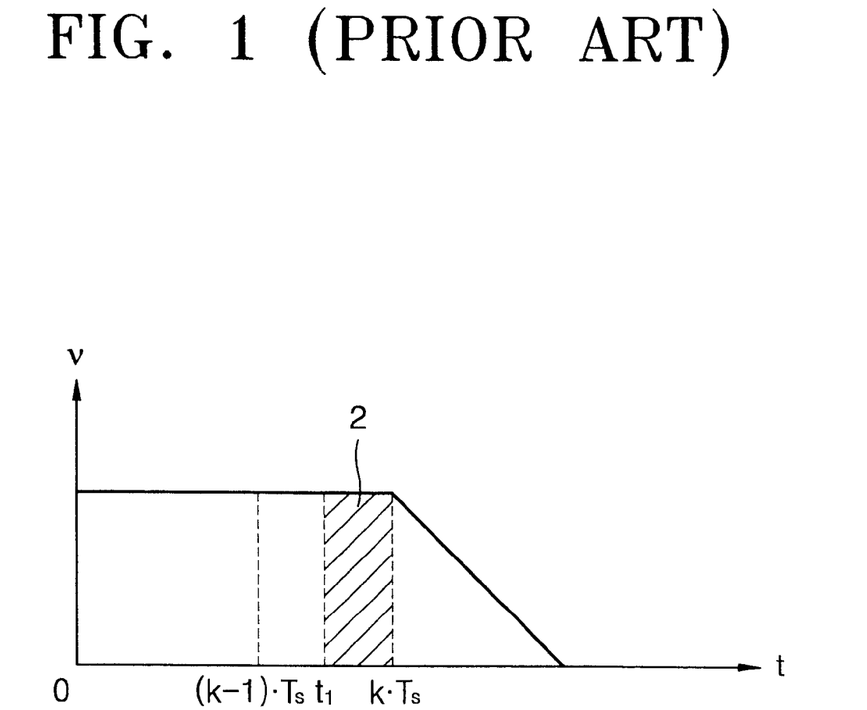
FIG. 1 is a graph for explaining a conventional method of controlling the rotation position of an object.

FIG. 1 is a graph for explaining a conventional indirect method of controlling the rotation position of an object, in which the rotational speed of the object to be controlled is plotted on the vertical axis and time is plotted on the horizontal axis. As shown in FIG. 1, the rotation speed of the object begins to be reduced at time k·Ts, not at time $t_1$ between (k−1)·Ts (k is an integer) and k·Ts, although speed reduction is required to commence at $t_1$ in order to stop the rotation of the object at the proper position. This is because in the conventional method of controlling the rotation position of the object, Equation 1 is calculated at intervals of Ts to generate a voltage necessary to control the object. As a result, the object does not stop rotating until it has rotated a distance equal to the area of hatched region 2 in FIG. 1, beyond a desired stopping position. To prevent this error, the predetermined period of time (Ts) can be reduced in consideration of several conditions, such as the performance of a central processing unit (CPU, not shown) and the time required for calculating Equation 1. However, if the predetermined period of time (Ts) is reduced, the CPU, which also performs other operations, has an increased burden.

Also, although the speed of the object must be reduced within a short time after k·Ts, the conventional indirect method of controlling the rotation position of an object takes significant time to calculate the cumulative error speed value Σe(kT) to obtain the voltage (as shown in Equation 1) to control the rotation of the object. Thus, since speed reduction cannot commence immediately, final stoppage of rotation is delayed.

Moreover, the length required for stopping the object increases due to the delay of speed reduction, and thus an error in position at which the object should stop increases.

SUMMARY OF THE INVENTION

Accordingly, it is an object of the present invention to provide a method of controlling the rotation position of an object that enables the rotated object to be accurately and precisely stopped at a desired position.

It is another object of the present invention to provide an apparatus to control the rotation of an object that enables the rotated object to be accurately and precisely stopped at a desired position.

Additional objects and advantages of the invention will be set forth in part in the description which follows and, in part, will be obvious from the description, or may be learned by practice of the invention.

The foregoing and/or other objects of the present invention are achieved by providing a method of controlling a rotation position of an object, the method including measuring first and second actual control variables which vary as the object rotates; determining whether the first actual control variable is smaller than a predetermined amount; determining whether a period of time has elapsed if it is determined that the first actual control variable is smaller than the predetermined amount; and obtaining a difference between a physical quantity that is generated corresponding to the first actual control variable and the second actual control variable, and determining a control amount to control the object using the obtained difference, if it is determined that the period of time has elapsed or the first actual control variable is larger than the predetermined amount, wherein the predetermined amount corresponds to a position at which the object is rotated to stop the object at a desired position.

The foregoing and/or other objects of the present invention are also achieved by providing an apparatus to control a rotation position of an object, the apparatus including a control variable measuring unit which measures first and second actual control variables that vary as the object rotates; a control signal generator which compares the first actual control variable input from the control variable measuring unit with a predetermined value and outputs the result of the comparison as a control signal; and a control amount determiner which compares the second actual control variable with a physical quantity that is generated corresponding to the first actual control variable at regular intervals of a period of time or irregularly in response to the output control signal, and determines a control amount from a result of the comparison, wherein the object operates in response to the control amount.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
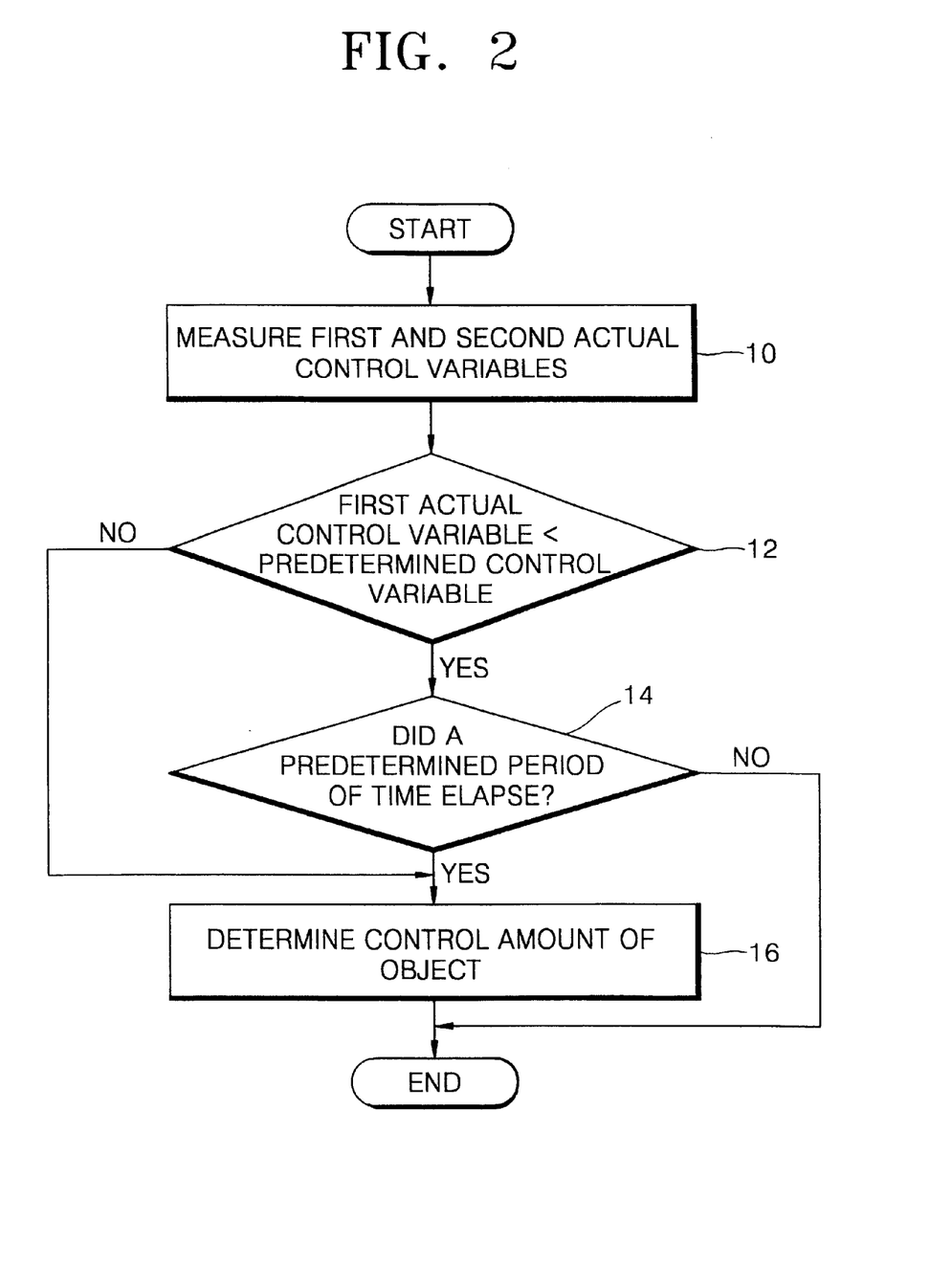
FIG. 2 is a flowchart illustrating a method of controlling the rotation position of an object according to an embodiment of the present invention.

FIG. 2 is a flowchart illustrating a method of controlling the rotation position of an object according to the present invention. The method includes operations 10 through 16 of determining a control amount of the object using first and second actual control variables.

Figure 3:
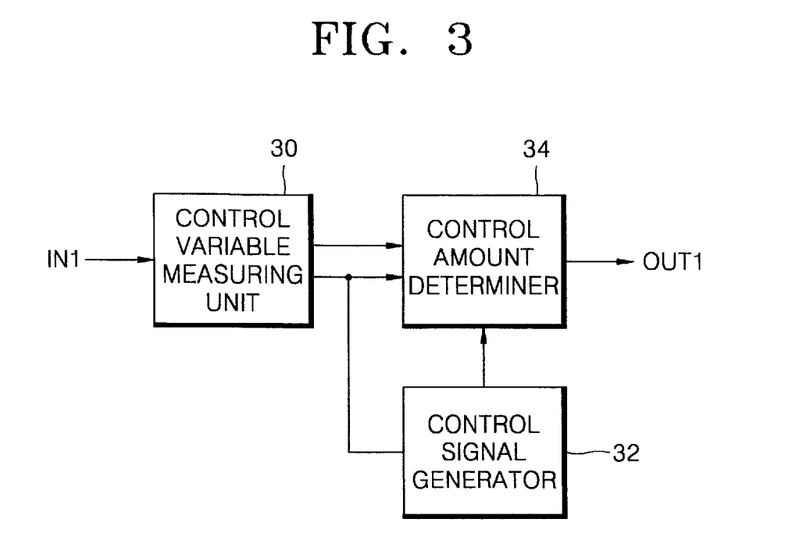
FIG. 3 is a block diagram of an apparatus according to the method of FIG. 2.

FIG. 3 is a block diagram of an apparatus to perform the method of controlling the rotation position of an object illustrated in FIG. 2. The apparatus includes a control variable measuring unit 30, a control signal generator 32, and a control amount determiner 34.

In the rotation controlling method according to the present invention, the rotation position, i.e., rotation angle of an object that is rotating, is controlled. Here, the object to be controlled may be a motor (not shown) or a device (not shown) which is driven by a motor. For example, the object may be a motor used in an inkjet printer to drive a line feed roller, or the object may be the line feed roller itself.

Referring to FIGS. 2 and 3, to perform the rotation position controlling method according to the present invention, in operation 10, the control variable measuring unit 30 measures first and second actual control variables which vary according to the rotation of the object (not shown) that is connected to the control variable measuring unit 30 via an input port IN1. The control variable measuring unit 30 then outputs the first and second actual variables to the control amount determiner 34 and outputs the first actual variable to the control signal generator 32. Here, the first actual control variable may be the rotation angle, i.e., the rotation position of the object, and the second actual control variable may be the rotation speed of the object.

Figure 4:
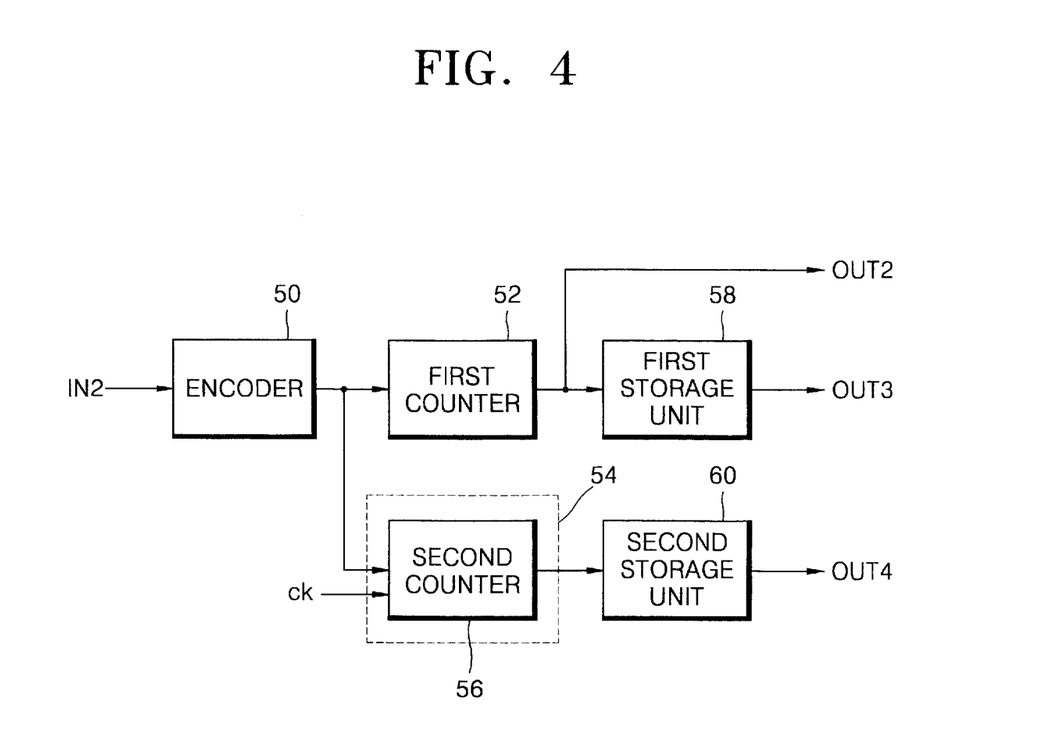
FIG. 4 is a block diagram of the control variable measuring unit shown in FIG. 3.

The structure and operation of the control variable measuring unit 30 shown in FIG. 3 will now be described. FIG. 4 is a block diagram of an example of the control variable measuring unit 30 shown in FIG. 3. The control variable measuring unit 30 includes an encoder 50, a first counter 52, a distance measuring unit 54, a second counter 56, a first storage unit 58, and a second storage unit 60.

The encoder 50 of the control variable measuring unit 30 of FIG. 4 senses the rotation of the object via an input port IN2 and outputs the sensed result as a signal with a square waveform. If the object is a motor (not shown) of an inkjet printer, or a line feed roller (not shown) that is driven by a motor, the encoder 50 senses the rotation amount of the shaft of the motor or the line feed roller.

Figure 5:
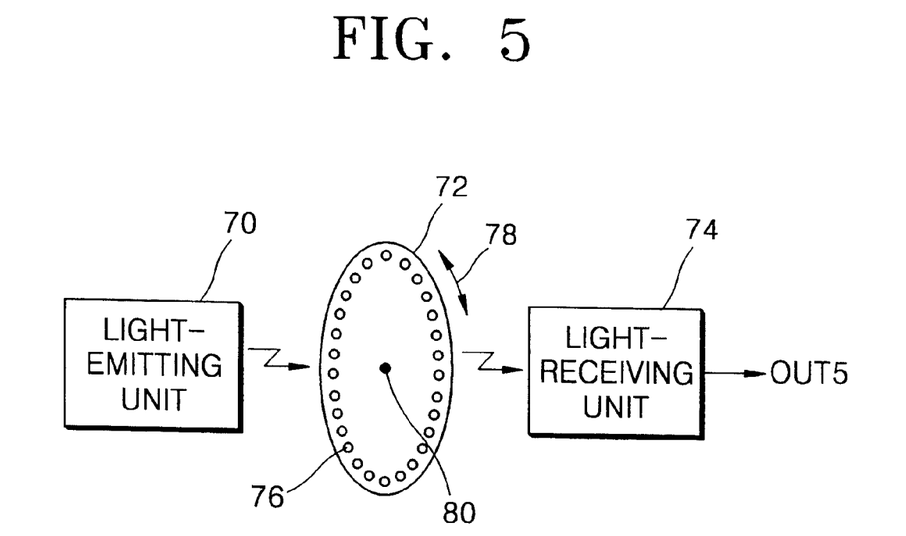
FIG. 5 is an exemplary block diagram of the encoder shown in FIG. 4.

FIG. 5 is an exemplary block diagram of the encoder 50 shown in FIG. 4. The encoder 50 of FIG. 5 includes a light-emitting unit 70, a rotating circular plate 72, and a light-receiving unit 74. Referring to FIG. 5, the rotating circular plate 72 has a plurality of holes 76 and rotates clockwise or counterclockwise 78 about a central shaft 80 when the object rotates. Here, the light-emitting unit 70 emits light to the holes 76 of the rotating circular plate 72, and the light-receiving unit 74 receives the light that passes through the holes 76, converts the received light into an electrical signal, and outputs the electrical signal as the sensed result in the form of a square wave via an output port OUT5. For example, the rotating circular plate 72 rotates clockwise or counterclockwise 78 when the object rotates. The light receiving unit 74 outputs an electrical signal via the output port OUT5 in the form of a square wave having a frequency that varies as the rotating circular plate 72 accelerates or decelerates. Thus, the encoder 50 may be a general rotary encoder.

The first counter 52 counts the number of rising or falling edges of a square wave input from the encoder 50, i.e., the number of pulses generated per unit time, and outputs the counted result as the first actual control variable to the first storage unit 58 and to the control signal generator 32 via an output port OUT2. Here, the distance measuring unit 54 measures the distance between the rising or falling edges of the square wave input from the encoder 50, i.e., the wavelength of the square wave, and outputs the measured result as the second actual control variable. To perform this operation, the distance measuring unit 54 may be the second counter 56, as shown in FIG. 4. The second counter 56 starts a counting operation in response to a system clock signal CK at the falling edge of the square wave input from the encoder 50, stops the counting operation at the rising edge of the square wave, and outputs the counted result as the second actual control variable. In other words, the second counter 56 counts how many pulses of the system clock signal exist between pulses of the square wave.

Referring back to FIG. 4, the control variable measuring unit 30 further includes the first and second storage units 58 and 60. The first storage unit 58 stores the first actual control variable input from the first counter 52 and outputs the first actual control variable to the control amount determiner 34 via an output port OUT3. The second storage unit 60 stores the second actual control variable input from the distance measuring unit 54 and outputs the second actual control variable to the control amount determiner 34 via an output port OUT 4. Thus, the first and second storage units 58 and 60 serve as buffers and allow the control amount determiner 34 to use the first and second actual control variables at a desired point in time.

After operation 10, in operation 12, it is determined whether the first actual control variable is smaller than a predetermined control variable. Here, the predetermined control variable corresponds to the position by which the object should be rotated for stopping the object at a desired position. For example, the predetermined control variable may correspond to a rotation angle where the rotation speed of the object starts to change. To perform operation 12, the control signal generator 32 compares the predetermined control variable with the first actual control variable input from the control variable measuring unit 30 and outputs the result of the comparison as a control signal to the control amount determiner 34.

Figure 6:
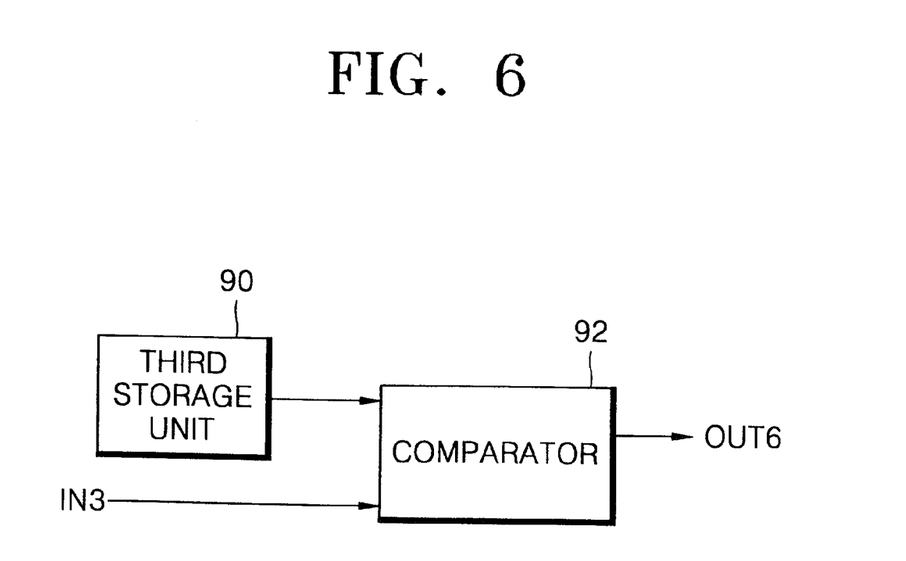
FIG. 6 is a block diagram of the control signal generator shown in FIG. 3.

FIG. 6 is a block diagram of an example of the control signal generator 32 shown in FIG. 3. The control signal generator 32 includes a third storage unit 90 and a comparator 92.

The third storage unit 90 stores the predetermined control variable and outputs the stored predetermined control variable to the comparator 92. Here, the predetermined control variable may be empirically obtained and stored in the third storage unit 90. The comparator 92 compares the predetermined control variable input from the third storage unit 90 with the first actual control variable input from the control variable measuring unit 30 via an input port IN3. The comparator 62 then outputs the compared result as a control signal to the control amount determiner 34 via an output port OUT6.

If it is determined in operation 12 that the first actual control variable is smaller than the predetermined control variable, it is determined in operation 14 whether a predetermined period of time has elapsed. To perform operation 14, the control amount determiner 34 checks whether a predetermined period of time has elapsed if the control amount determiner 34 perceives through the control signal input from the control signal generator 32 that the first actual control variable is smaller than the predetermined control variable.

Here, if it is determined in operation 14 that the predetermined period of time has elapsed, or in operation 12 that the first actual control variable is larger than the predetermined control variable, a difference between a physical quantity generated corresponding to the first actual control variable and the second actual control variable is obtained, and the control amount of the object is determined based on the difference in operation 16. Here, if the first actual control variable corresponds to the rotation angle of the object, the physical quantity may be the rotation speed of the object, and the object operates in response to the control amount. For example, if the object is a motor, the control amount may be used to adjust the torque of the motor. To perform operation 16, the control amount determiner 34 may determine the control amount by comparing the physical quantity that is regularly generated at intervals of a predetermined period of time according to the first actual control variable, with the second actual control variable, and by using the comparison result. Alternatively, the control amount determiner 34 may determine the control amount by comparing the physical quantity that is irregularly generated in response to the control signal input from the control signal generator 32 corresponding to the first actual control variable with the second actual control variable, and by using the comparison result.

Figure 7:
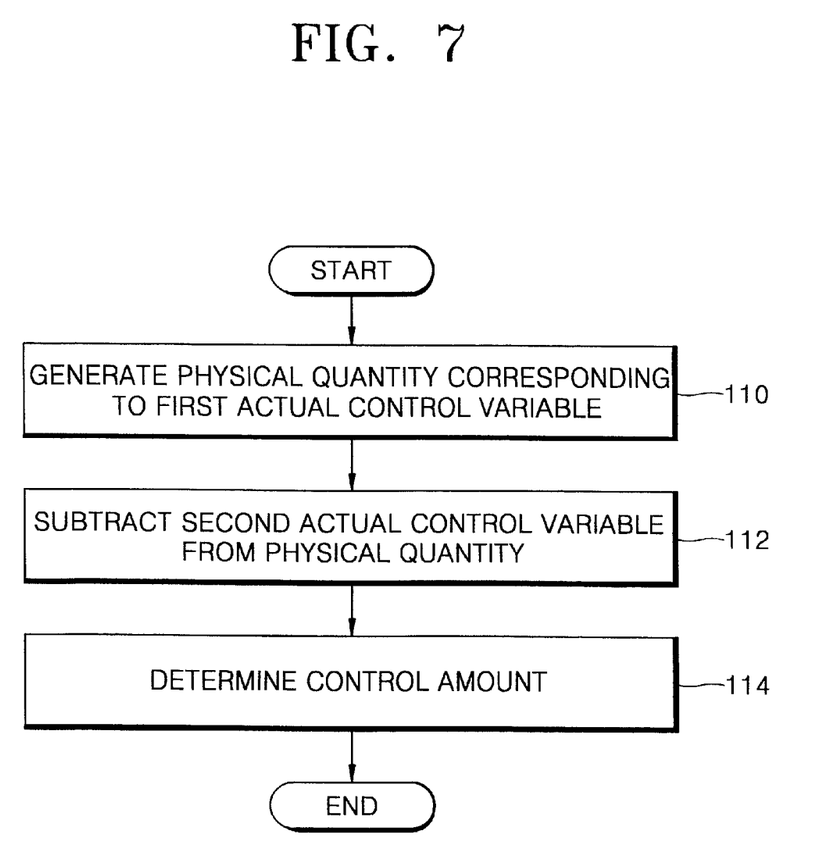
FIG. 7 is a flowchart of operation 16 of FIG. 2.

FIG. 7 is a flowchart of operation 16 of the method shown in FIG. 2. Operation 16 includes operations 110 through 114 to determine the control amount using the first and second actual control variables and the control signal.

Figure 8:
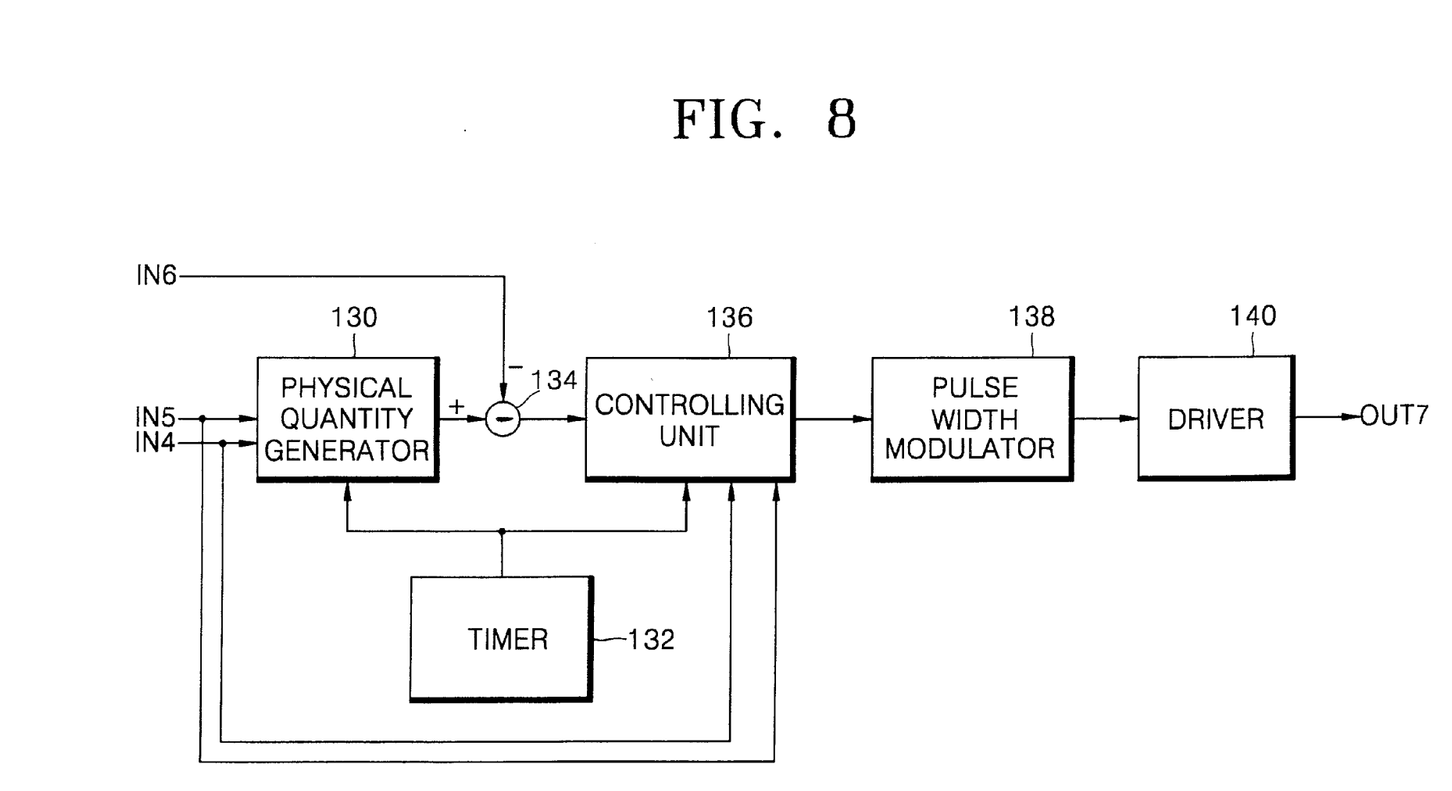
FIG. 8 is a block diagram of the control amount determiner shown in FIG. 3.

FIG. 8 is a block diagram of the control amount determiner 34 shown in FIG. 3. The control amount determiner 34 includes a physical quantity generator 130, a timer 132, a subtractor 134, a controlling unit 136, a pulse width modulator 138, and a driver 140.

Referring now to FIG. 7, if it is determined in operation 14 of the method of FIG. 2 that the predetermined period of time has elapsed, or if it is determined in operation 12 of the method of FIG. 2 that the first actual control variable is larger than the predetermined control variable, the physical quantity corresponding to the first actual control variable is generated in operation 110. In other words, the physical quantity generator 130 regularly generates the physical quantity corresponding to the first actual control variable input via an input port IN5 in response to a timing signal input from the timer 132. To perform this operation, the timer 132 generates the timing signal at intervals of a predetermined period of time and outputs the time signal to the physical quantity generator 130 and the controlling unit 136. Here, the physical quantity generator 130 perceives through the timing signal whether the predetermined period of time has elapsed. Also, the physical quantity generator 130 irregularly generates the physical quantity corresponding to the first actual control variable input via the input port IN5 in response to the control signal input via the input port IN4. Here, the physical quantity generator 130 perceives through the control signal whether the first actual control variable is larger than the predetermined control variable.

After operation 110, in operation 112, the subtractor 134 subtracts the second actual control variable input from the control variable measuring unit 30 via input port IN6 from the physical quantity generated by the physical quantity generator 130 and outputs the subtraction result as an error (or the speed error) to the controlling unit 136.

After operation 112, in operation 114, the control unit 136 determines a control voltage from the error input from the subtractor 134 in response to the timing signal input from the timer 132 or the control signal input via the input port IN4. Here, the control amount by which the object is to be controlled is determined to correspond to the control voltage, and the control voltage is determined in response to the timing signal while considering the cumulative error, while the control voltage is determined in response to the control signal without considering the cumulative error.

As described above, in the method and apparatus of controlling the rotation position of an object according to the present invention, the physical quantity is generated at time $t_1$ shown in FIG. 1 in which the first actual control variable is larger than the predetermined control variable. Thus, the control unit 136 can generate the control voltage at time $t_1$ to instantaneously reduce the rotation speed of the object. Also, according to the present invention, if the first actual control variable is larger than the predetermined control variable, the control voltage can be generated without considering the cumulative error so as to stop the rotation of the object within a short time.

Figure 9:
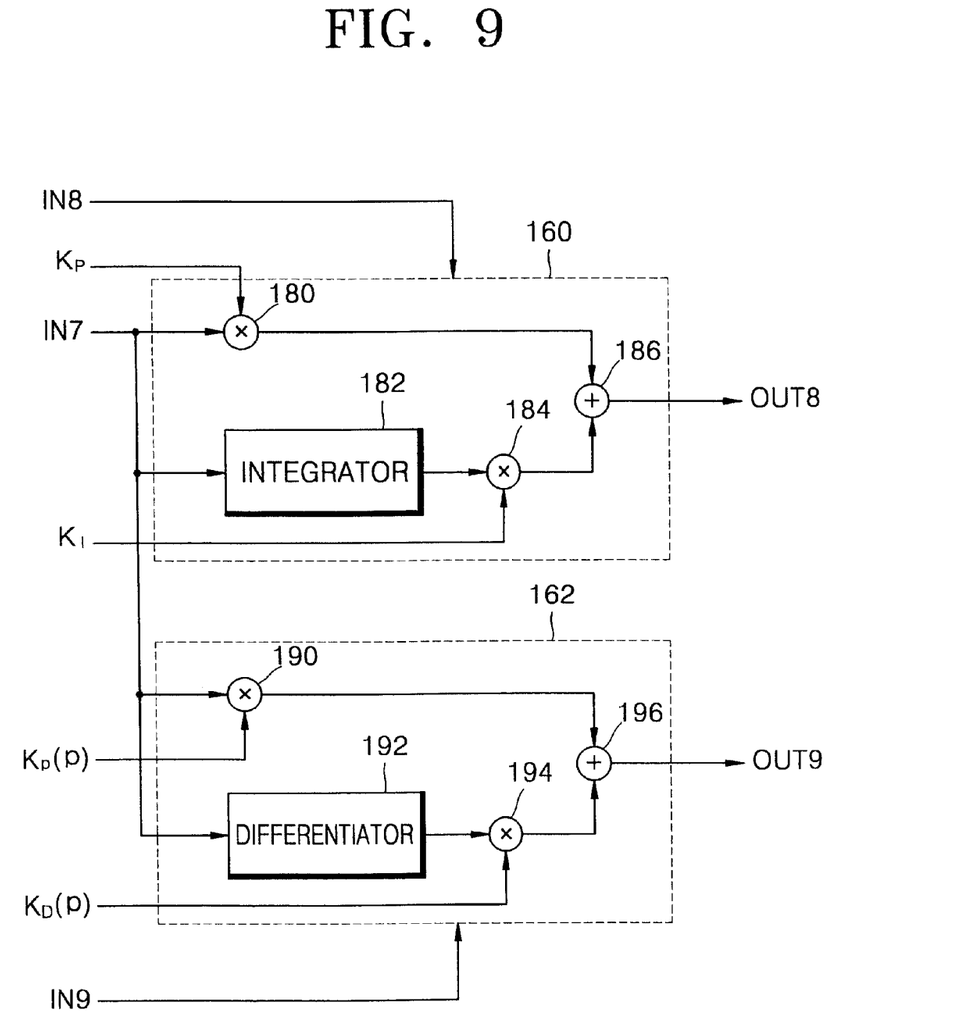
FIG. 9 is a block diagram of the control unit shown in FIG. 8.

FIG. 9 is a block diagram of the control unit 136 shown in FIG. 8. The control unit 136 includes first and second controllers 160 and 162 to perform operation 114 described above. Here, if it is perceived through the timing signal input from the timer 132 that the predetermined period of time has elapsed, the first controller 160 of the control unit 136 determines the control voltage by proportionally integrating the error input from the subtractor 134 using the Laplace transform of Equation 1, shown below as Equation 2:

$$U(s) = K_P E(s) + \frac{K_I}{s} E(s) \tag{2}$$

wherein U(s) is the control voltage, E(s) is the error, s is jw, and $K_P$ and $K_I$ are first and second predetermined weights, respectively.

Also, if it is perceived through the control signal input from the input port IN4 that the first actual control variable is larger than the predetermined control variable, the second controller 162 of the control unit 136 determines the control voltage by proportionally differentiating the error using Equation 3:

$$U(s) = K_P(p) E(s) + K_I(p) s E(s) \tag{3}$$

wherein $K_P(p)$ and $K_I(p)$ are first and second variable weights, respectively, and p is the first actual control variable. Here, the predetermined control variable may be the rotation angle where the control voltage begins to be generated using Equation 3 instead of Equation 2.

The first controller 160 includes first and second multipliers 180 and 184, an integrator 182, and a first adder 186. The first multiplier 180 multiplies the first predetermined weight $K_P$ and the error input from the subtractor 134 via an input port IN7 together and outputs the multiplication result to the first adder 186. Meanwhile, the integrator 182 integrates the error input from the subtractor 134 via the input port IN7 and outputs the integration result to the second multiplier 184. The second multiplier 184 multiplies the result of integration input from the integrator 182 by the second predetermined weight $K_I$ and outputs the multiplication result to the first adder 186. Finally, the first adder 186 adds the multiplication results input from the first multiplier 180 and the second multiplier 184 and outputs the result of the addition as the control voltage via an output port OUT8. Here, to generate the control voltage at intervals of a predetermined period of time, the first and second multipliers 180 and 184, the integrator 182, and the first adder 186 operate in response to the timing signal input from the timer 132 via an input port IN8.

The second controller 162 includes third and fourth multipliers 190 and 194, a differentiator 192, and a second adder 196. The third multiplier 190 multiplies the first variable weight $K_P(p)$ and the error input from the subtractor 134 via the input port IN7 together and outputs the differentiation result to the second adder 196. Here, the first variable weight $K_P(p)$ varies in response to the first actual control variable p. The differentiator 192 differentiates the error input from the subtractor 134 via the input port IN7 and outputs the result to the fourth multiplier 194. The fourth multiplier 194 multiplies the result of the differentiation input from the differentiator 192 by the second variable weight $K_P(p)$ and outputs the multiplication result to the second adder 196. Here, the second variable weight $K_I(p)$ varies in response to the first actual control variable p. The controlling unit 136 shown in FIG. 9 may include an additional weight generator (not shown) which generates the first and second variable weights $K_P(p)$ and $K_I(p)$ from the first actual control variable p input from the input port IN5. Finally, the second adder 196 adds the result of the multiplication in the third multiplier 190 and the result of multiplication in the fourth multiplier 194 and outputs the result of the addition as the control voltage via an output port OUT9. Here, to generate the control voltage whenever the first actual control variable is larger than the predetermined control variable, the third and fourth multipliers 190 and 194, the differentiator 192, and the second adder 196 operate in response to the control signal input from the control signal generator 32 via an input port IN9.

To determine the control amount from the control voltage generated by the control unit 136, the control amount determiner 34 may further include the pulse width modulator 138 and the driver 140 shown and described with reference to FIG. 8. Here, the pulse width modulator 138 outputs to the driver 140 a pulse width-modulated signal having a duty that varies corresponding to the control voltage input from the control unit 136. In other words, the pulse width modulator 138 generates the pulse width-modulated signal having different lengths of "high" and "low" logic levels based on the size of the control voltage within a unit period. Then, the driver 140 generates the control amount in the form of a current corresponding to the pulse width-modulated signal input from the pulse width modulator 138 and outputs the generated control amount to the object via the output port OUT7. In other words, the driver 140 performs a voltage/current conversion operation in which a pulse width-modulated signal in a voltage form is converted into a pulse width-modulated signal in a current form.

As described above, the method and apparatus to control the rotation position of an object according to the present invention reduce an uncertain variation in a position where a rotating object is controlled to stop so as to precisely stop the object at the desired rotation position, thus enabling precise control of the amount of rotation of the object. The method and the apparatus may stop a roller precisely at a desired position when being used to control the rotation of the roller of an inkjet printer, thereby preventing the formation of black or white lines in a printed image.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of controlling a rotation position of an object, the method comprising:

measuring first and second actual control variables which vary as the object rotates;

determining whether the first actual control variable is smaller than a predetermined amount;

determining whether a period of time has elapsed in response to determining that the first actual control variable is smaller than the predetermined amount; and obtaining a difference between a physical quantity that is generated corresponding to the first actual control variable and the second actual control variable, and determining a control amount to control the object using the obtained difference, in response to determining that the period of time has elapsed or the first actual control variable is larger than the predetermined amount, wherein the predetermined amount corresponds to a position at which the object is rotated to stop the object at a desired position.

2. The method of claim 1, wherein the obtaining of the difference comprises:

generating the physical quantity corresponding to the first actual control variable in response to determining that the period of time has elapsed or the first actual control variable is larger than the predetermined amount;

subtracting the second actual control variable from the physical quantity corresponding to the first actual control variable and determining a result of the subtracting as the obtained difference; and determining the control amount by proportionally integrating the obtained difference in response to determining that the period of time has elapsed, and determining the control amount by proportionally differentiating the obtained difference in response to determining that the first actual control variable is larger than the predetermined amount.

3. The method of claim 1, wherein the first actual control variable corresponds to a rotation angle of the object and the second actual control variable corresponds to a rotation speed of the object.

4. An apparatus to control a rotation position of an object, the apparatus comprising:

a control variable measuring unit which measures first and second actual control variables that vary as the object rotates;

a control signal generator which compares the first actual control variable input from the control variable measuring unit with a predetermined value and outputs the result of the comparison as a control signal; and a control amount determiner which compares the second actual control variable with a physical quantity that is generated corresponding to the first actual control variable at regular intervals of a period of time or irregularly in response to the output control signal and determines a control amount from a result of the comparison, wherein the object operates in response to the control amount.

5. The apparatus of claim 4, wherein the control variable measuring unit comprises:

an encoder which senses the rotation of the object and outputs the result of the sensing in the form of a square wave;

a first counter which counts a rising or a falling edge of the square wave and outputs the result of the counting as the first actual control variable; and a distance measuring unit which measures a distance between the rising or the falling edges of the square wave and outputs the result of the measurement as the second actual control variable.

6. The apparatus of claim 5, wherein the distance measuring unit comprises a second counter which performs a counting operation starting from the falling edge of the square wave and ending at the next rising edge of the square wave, in response to a system clock signal, and outputs the result of the counting operation as the second actual control variable.

7. The apparatus of claim 5, wherein the control variable measuring unit further comprises:

a first storage unit which stores the first actual control variable output from the first counter; and a second storage unit which stores the second actual control variable output from the distance measuring unit.

8. The apparatus of claim 4, wherein the control signal generator comprises:

a third storage unit which stores the predetermined value; and a comparator which compares the first actual control variable measured by the control variable measuring unit with the predetermined value stored by the third storage unit and outputs a result of the comparison as the control signal.

9. The apparatus of claim 4, wherein the control amount determiner comprises:

a physical quantity generator which generates the physical quantity corresponding to the first actual control variable in response to a timing signal or the control signal;

a subtractor which subtracts the second actual control variable from the physical quantity and outputs a result of the subtraction as an error;

a control unit which determines a control voltage from the outputted error in response to the timing signal; and a timer which generates the timing signal at the intervals of the predetermined period of time, wherein the control amount is determined to correspond to the control voltage.

10. The apparatus of claim 9, wherein the control amount determiner comprises:

a pulse width modulator which outputs a pulse width-modulated signal having a duty that varies corresponding to the control voltage; and a driver which generates the control amount in the form of a current corresponding to the pulse width-modulated signal and outputs the control amount to the object.

11. The apparatus of claim 9, wherein the control unit determines the control voltage from the error in response to the timing signal or the control signal.

12. The apparatus of claim 11, wherein the control unit comprises:

a first controller which determines the control voltage by proportionally integrating the error in response to the timing signal; and a second controller which proportionally differentiates the error and determines the control voltage in response to the control signal.

13. The apparatus of claim 12, wherein the first controller comprises:

a first multiplier which multiplies a first weight and the error together and outputs a result of the multiplication;

an integrator which integrates the error and outputs a result of the integration;

a second multiplier which multiplies the result of the integration by a second weight and outputs a result of the multiplication; and a first adder which adds the result of the multiplication in the first multiplier and the result of the multiplication in the second multiplier and outputs a result of the addition as the control voltage, wherein the first and second multipliers, the integrator, and the first adder operate in response to the timing signal.

14. The apparatus of claim 12, wherein the second controller comprises:

a first multiplier which multiplies a first variable weight and the error together and outputs a result of the multiplication;

a differentiator which differentiates the error and outputs a result of the differentiation;

a second multiplier which multiplies the result of the differentiation of the differentiator by a second variable weight and outputs a result of the multiplication; and a second adder which adds the result of the multiplication in the first multiplier and the result of the multiplication in the second multiplier and outputs a result of the addition as the control voltage, wherein the first and second variable weights vary in response to the first actual control variable, and the first multiplier, the differentiator, the second multiplier, and the second adder operate in response to the control signal.

15. The apparatus of claim 5, wherein the encoder comprises:

a light-emitting unit to emit light;

a rotating circular plate having a plurality of holes to rotate with the object, the emitted light passing through the holes; and a light-receiving unit to receive the passed light, and convert the received light to the square wave.

16. A method of controlling a rotating object, the method comprising:

measuring first and second control variables of the object;

generating a third control variable which corresponds to the first control variable;

obtaining a difference between the second and third control variables; and determining a control amount to control the object using the obtained difference.

17. The method of claim 16, further comprising:

determining whether the first control variable is larger than a predetermined amount; and determining whether a period of time has elapsed in response to determining that the first actual control variable is not larger than the predetermined amount, wherein the obtaining of the difference occurs only in response to determining that the first control variable is larger than the predetermined amount, or the period of time has elapsed.

18. The method of claim 17, wherein the first and second control variables vary as the object rotates.

19. The method of claim 18, wherein the predetermined amount corresponds to a position to which the object is rotated to stop the object at a desired position.

20. The method of claim 19, wherein the first control variable is a position of the object, and the second control variable is a speed of the object.

21. The method of claim 18, wherein the predetermined amount corresponds to a position where a rotation speed of the object starts to change.

22. The method of claim 18, wherein the third control variable is regularly generated.

23. The method of claim 18, wherein the third control variable is irregularly generated.

24. An apparatus to control a rotating object, comprising:

a measuring unit to measure first and second control variables of the object;

a generator to generate a third control variable which corresponds to the first control variable; and a control amount determiner to obtain a difference between the second and third control variables and determine a control amount to control the object using the obtained difference.

25. The apparatus of claim 24, wherein the generator determines whether the first control variable is larger than a predetermined amount, and determines whether a period of time has elapsed in response to determining that the first control variable is not larger than the predetermined amount, and the control amount determiner obtains the difference only in response to determining that the first control variable is larger than the predetermined amount, or the period of time has elapsed.

26. A printer comprising:

a rotating object; and an apparatus to control the rotating object, comprising:

a measuring unit to measure first and second control variables of the rotating object;

a generator to generate a third control variable which corresponds to the first control variable; and a control amount determiner to obtain a difference between the second and third control variables and determine a control amount to control the object using the obtained difference.

* * * * *